United States Patent [19]

Hamashima et al.

[11] Patent Number: 5,479,537
[45] Date of Patent: Dec. 26, 1995

[54] IMAGE PROCESSING METHOD AND APPARATUS

[75] Inventors: Muneki Hamashima; Shinichi Okita, both of Tokyo, Japan

[73] Assignee: Nikon Corporation, Tokyo, Japan

[21] Appl. No.: 880,592

[22] Filed: May 8, 1992

[30] Foreign Application Priority Data

May 13, 1991 [JP] Japan .................................. 3-137221
Aug. 23, 1991 [JP] Japan .................................. 3-237456

[51] Int. Cl.$^6$ .................................................. G06K 9/40
[52] U.S. Cl. ........................ 382/266; 382/263; 382/218; 382/199
[58] Field of Search .............................. 382/34, 42, 22, 382/30

[56] References Cited

U.S. PATENT DOCUMENTS 3,986,000  10/1976  McJohnson ..................... 364/728.03
5,018,218   5/1991  Peregrim et al. ................. 382/30
5,068,746  11/1991  Ohsawa et al. .................. 382/54

Primary Examiner—Leo H. Boudreau
Assistant Examiner—D. R. Anderson
Attorney, Agent, or Firm—Shapiro and Shapiro

[57] ABSTRACT

In an image processing method of effecting the pattern matching of an input image and a pre-memorized reference image, the reference image is pre-memorized in memory means and the input image is input to input means. The reference image and the input image obtained from the memory means and the input means, respectively, have the same differential filters applied thereto by differentiation means, whereby a differential reference image and a differential input image are obtained. The differential reference image and the differential input image are input to differential correlation value calculation means or inner product sum calculation means, whereby the cross-correlation value or the inner product sum of these is calculated, and the local maximum value of the cross-correlation value or the inner product sum is found by image recognizing means to thereby find the relative positional relation between the reference image and the input image.

18 Claims, 9 Drawing Sheets

FIG. 5
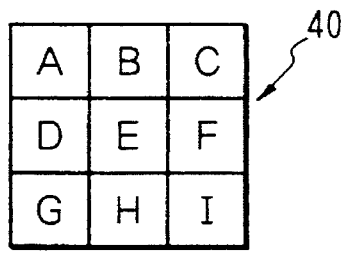
FIG. 6
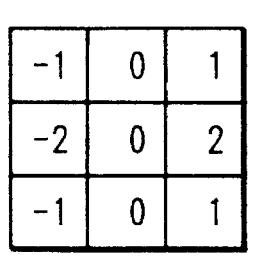 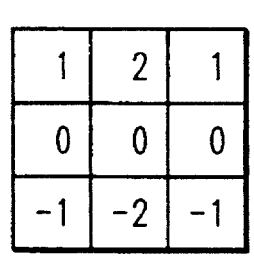
FIG. 7
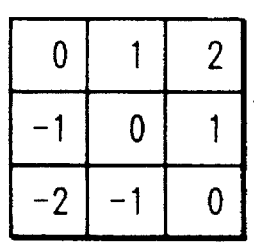 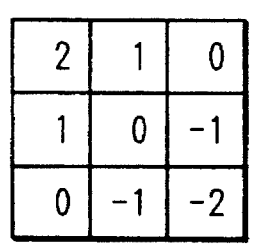

FIG. 8
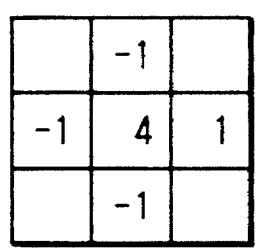
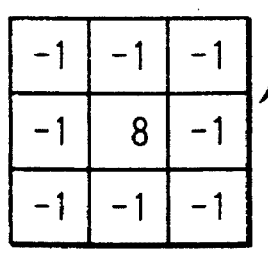
FIG. 9
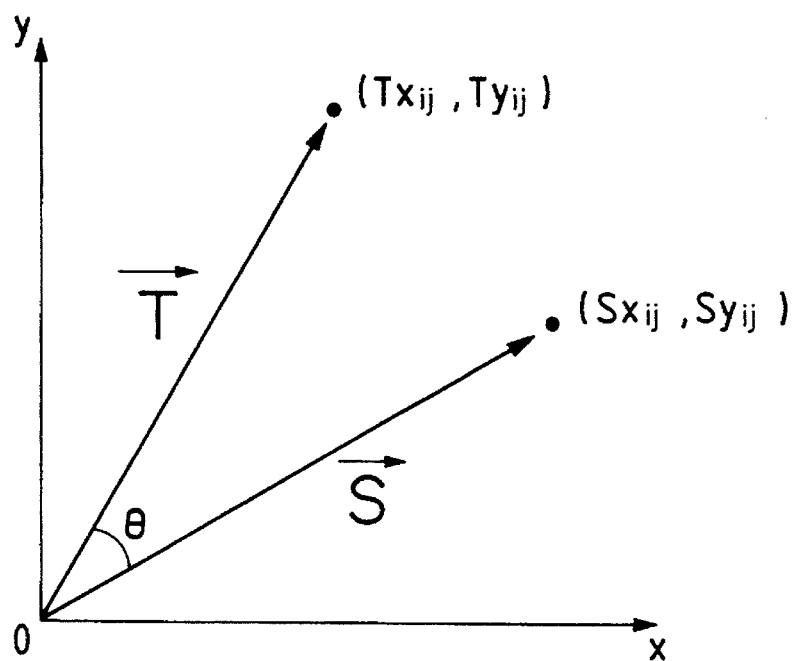

INPUT IMAGE

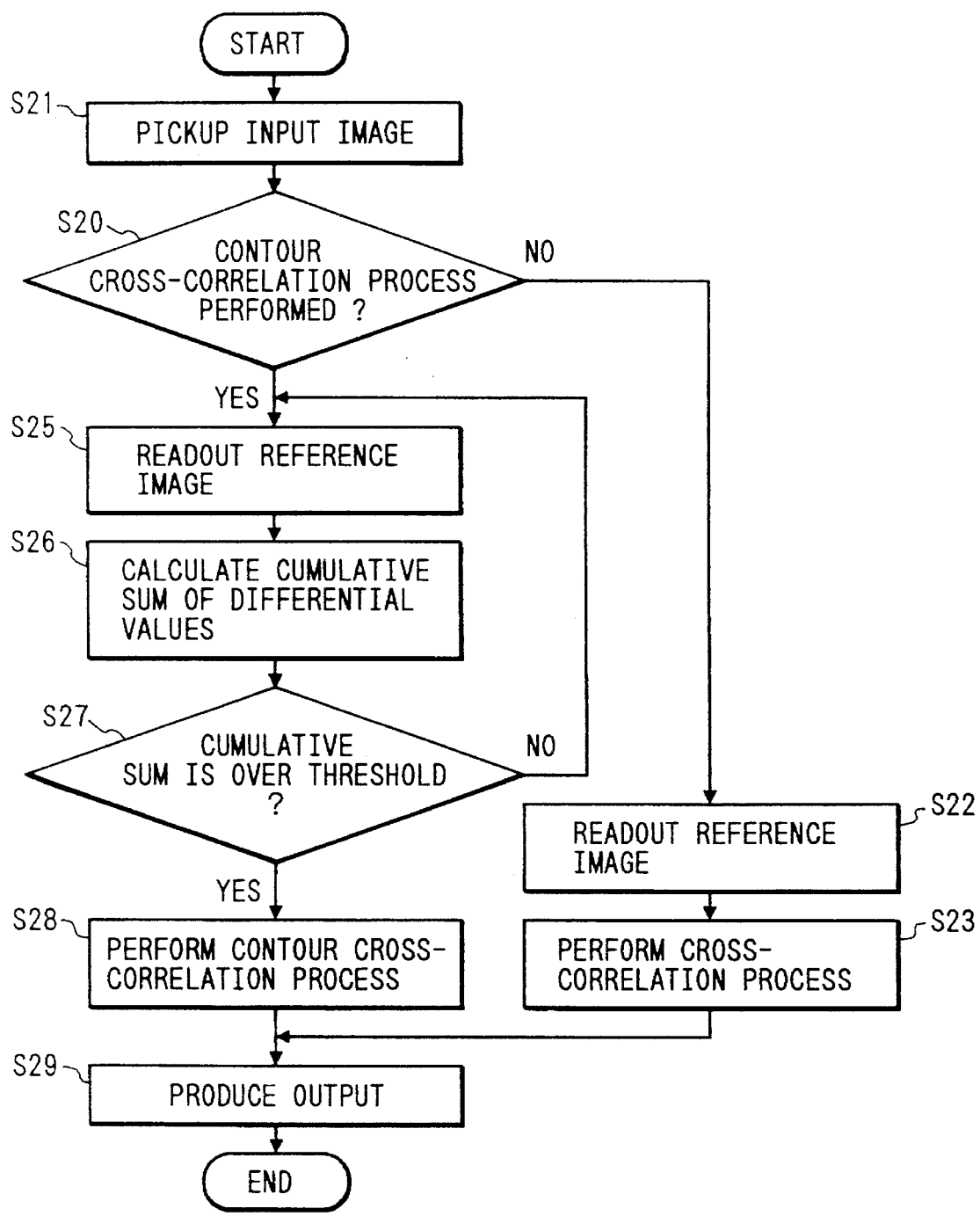

IMAGE PROCESSING METHOD AND APPARATUS

BACKGROUND OF THE INVENTION

1. Field of the Invention

This invention relates to an image processing method and apparatus for effecting the pattern matching of an input image and a pre-memorized reference image.

2. Related Background Art

There is known an image processing apparatus in which an input image including images of various patterns is compared with a reference image of predetermined pattern by a pattern matching technique to thereby discriminate between the reference image and a pattern image identical or similar thereto, and the relative position occupied in the input image by the identical or similar pattern image is found.

As such a pattern matching technique, there is a technique whereby images to be compared equal in size to the reference image are successively cut out from the input image from which a cross-correlation is to be taken, and without these images to be compared and the reference image being binarized but with these images remaining to be gradation images, the cross-correlation values thereof are successively found and the position occupied in the input image by the image to be compared having a pattern image identical or similar to the reference image is found from these cross-correlation values. In this case, in order to eliminate the influence by the brightness or contrast of the image, it is practiced to normalize the cross-correlation values by the mean value and dispension value of the image.

The calculation of the cross-correlation is effected by finding with respect to the images S to be compared which are successively cut out from the input image and the reference image T, dispersions Ds and Dt $$D_T = 1/(M \times N) \times \sum_{i=1}^{M} \sum_{j=1}^{N} \left\{ T_{ij} - 1/(M \times N) \times \sum_{i=1}^{M} \sum_{j=1}^{N} (T_{ij}) \right\}^2 \quad (1)$$

$$D_S = 1/(M \times N) \times \sum_{i=1}^{M} \sum_{j=1}^{N} \left\{ S_{ij} - 1/(M \times N) \times \sum_{i=1}^{M} \sum_{j=1}^{N} (S_{ij}) \right\}^2 \quad (2)$$

and the co-dispersion Dst of the images S and T $$D_{st} = 1/(M \cdot N) \cdot \quad (3)$$

$$\sum_{i=1}^{M} \sum_{j=1}^{N} \left[ \left\{ T_{ij} - 1/(M \times N) \times \sum_{i=1}^{M} \sum_{j=1}^{N} (T_{ij}) \right\} \times \left\{ S_{ij} - 1/(M \times N) \times \sum_{i=1}^{M} \sum_{j=1}^{N} (S_{ij}) \right\} \right]$$

and calculating, from these dispersions Ds and Dt and the co-dispersion Dst, the correlation coefficient $C_{ST}$ $$C_{ST} = \frac{Dst}{\sqrt{Dt} \times \sqrt{Ds}} \quad (4)$$

Here, M is the number of picture elements in the area wherein cross-correlation calculation is to be effected in X-direction, and N is the number of picture elements in such area in Y-direction.

The correlation coefficient $C_{ST}$ assumes a value within the range of $-1 \leq C_{ST} \leq 1$, and assumes a value of $C_{ST}=1$ when the images S to be compared coincide with the reference image T, and assumes a value of $C_{ST}=0$ when there is no correlation.

Generally, the input image is larger than the reference image. Accordingly, images to be compared equal in size to the reference image are successively cut out from the input image from which the cross-correlation is to be taken, and the correlation coefficient $C_{ST}$ is found with respect to each of the images to be compared. Pattern matching is effected with the position of the image to be compared which assumes the local maximum value of the correlation exceeding a predetermined threshold value as a location at which it coincides with the reference image.

In the pattern matching by cross correlation, the information of the gradation distribution of the entire pattern is used and matching is effected with this as the feature of each image, and this leads to the advantage that even if there is a variation in brightness or contrast between the images S to be compared and the reference image T, the recognition of the pattern can be accomplished relatively reliably and also, even if there is a minor defect in the pattern, the pattern can be recognized.

However, in the pattern matching by the cross-correlation calculation according to the prior art, when a pattern 61 as shown in FIG. 12 of the accompanying drawings which comprises only contours by a line drawing is used as the reference image T, information as gradation is little, and this has led to the possibility of wrong recognition.

Also, in the pattern matching by the cross-correlation calculation according to the prior art, the recognition of a pattern is effected by seeing the coincident state of the gradation distribution of the entire pattern and therefore, if the gradation distribution itself of this pattern partly varies, accurate pattern recognition will become difficult. Further, if with a view to enhance the speed of the calculation process, compression and averaging are effected on the images S to be compared which have been cut out from the input image or the reference image T, the information of the gradation distribution will be harmed by compression and averaging because the pattern 61 as shown in FIG. 12 which comprises only contours has a sensitive gradation distribution only in the edge portion thereof, and as a result, the possibility of the wrong recognition of the images S to be compared relative to the reference image T will become high.

Particularly, where the contour line of a pattern is based on the unevenness of an object, the pattern 61 as shown in FIG. 12 which comprises only contours will readily become a pattern 62, 63 or 64 as shown in FIG. 13 of the accompanying drawings, depending on the direction of light applied to the object. An image including the contour pattern 61 shown in FIG. 12 and an image including the pattern 62, 63 or 64 shown in FIG. 13 entirely differ in the gradation distribution thereof from each other. This has led to the problem that in the pattern matching by the cross-correlation calculation, the patterns differing in the gradation distribution thereof from each other are recognized as different ones.

SUMMARY OF THE INVENTION

It is the object of the present invention to provide an image processing method and apparatus which can reliably accomplish pattern recognition with respect also to an image including a pattern comprising only contours by a line drawing and moreover can accomplish reliable pattern recognition even if there is a partial variation in the contrast of gradation.

According to a preferred embodiment, the image processing apparatus of the present invention includes memory means in which a reference image is pre-memorized, input means to which an input image is input, differentiation means for differentiating said reference image and said input image to thereby obtain a differential reference image and a differential input image, differential correlation value calculation means for calculating the cross-correlation value of said differential reference image and said differential input image, and image recognizing means for finding the position occupied in the entire input image by an input image portion providing the local maximum value of said cross-correlation value which exceeds a predetermined threshold value.

According to another preferred embodiment, the image processing means of the present invention includes memory means in which a reference image is pre-memorized, input means to which an input image is input, differentiation means for applying partial differential filters in X-direction and Y-direction to both of said reference image and said input image to thereby obtain two kinds of differential reference images and two kinds of differential input images, inner product sum calculation means for calculating the inner product sum of a differential reference image vector and a differential input image vector having the values of said two kinds of differential reference images and said two kinds of differential input images, respectively, as components in X-direction and Y-direction, and image recognizing means for finding the position occupied in the entire input image by an input image portion giving the local maximum value of said inner product sum which exceeds a predetermined threshold value.

According to still another preferred embodiment, the image processing apparatus of the present invention includes memory means in which a reference image is pre-memorized, input means to which an input image is input, differentiation means for differentiating said reference image and said input image to thereby obtain a differential reference image and a differential input image, differential correlation value calculation means for calculating the cross-correlation value of said differential reference image and said differential input image, and discrimination means for discriminating the state of the pattern matching of said input image and said reference image from said cross-correlation value.

According to the present invention, an input image and a reference image are differentiated and the correlation between the images is found by the use of the differential values thereof and therefore, reliable pattern recognition can be accomplished even if a pattern comprising only contours by a line drawing is used as the reference image. Also, even if there is a partial variation in the contrast of gradation between the input image and the reference image, there is little possibility of wrong recognition being effected as in normalized cross-correlation calculation and reliable pattern recognition can be accomplished.

BRIEF DESCRIPTION OF THE DRAWINGS

FIG. 5 shows an image of popular (3×3) matrix.

FIG. 6 shows X-direction and Y-direction Sobel calculation filters.

FIG. 7 shows XY-direction Sobel calculation filters.

FIG. 8 shows Laplacian calculation filters.

FIG. 9 shows vectors $\vec{S}$ and $\vec{T}$ and the components thereof.

FIG. 11 is a flow chart for illustrating the operation of an image processing apparatus which is a second embodiment of the present invention.

DESCRIPTION OF THE PREFERRED EMBODIMENTS

Figure 1:
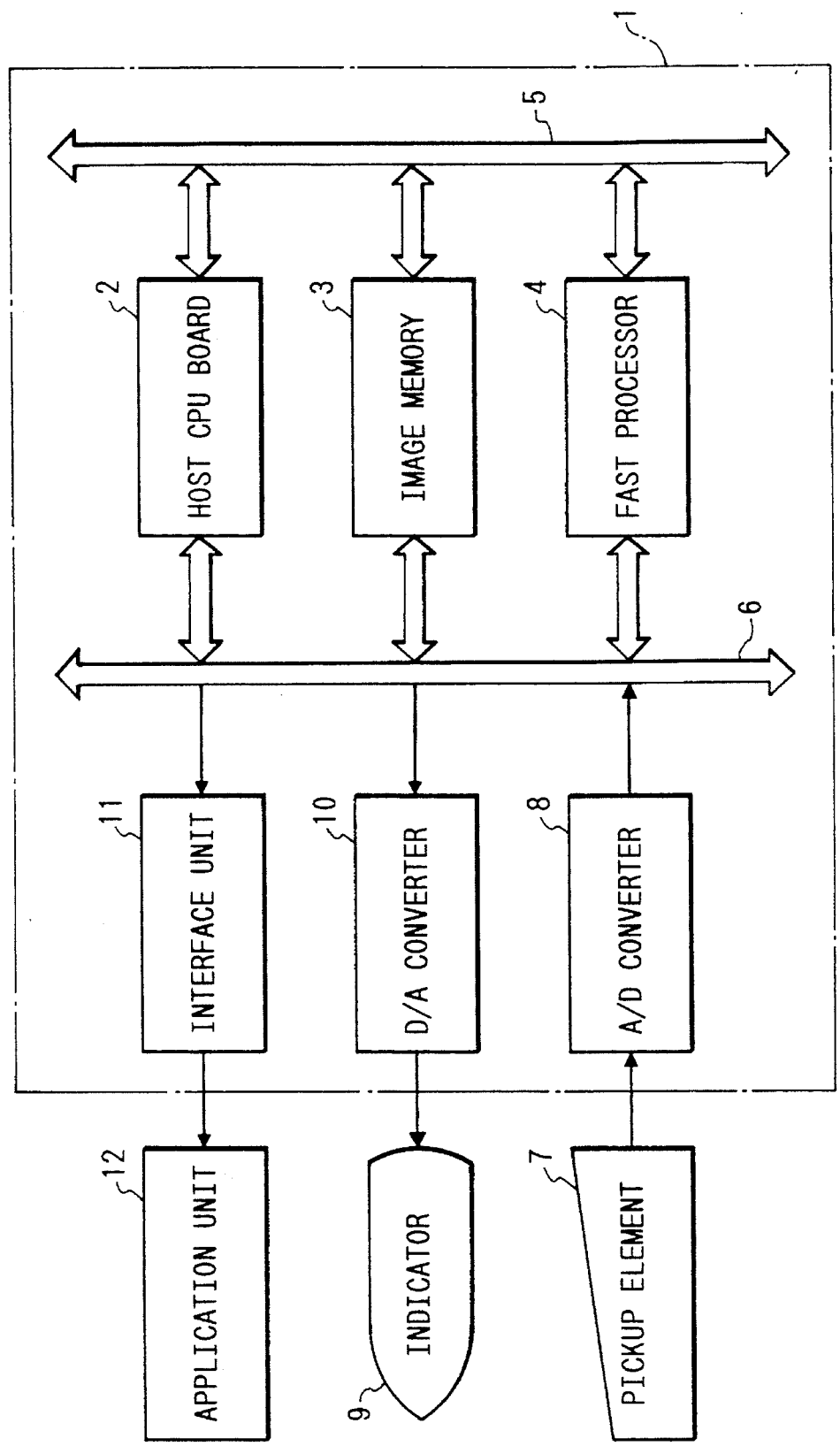
FIG. 1 is a block diagram showing the construction of an image processing apparatus which is a first embodiment of the present invention.
Figure 2:
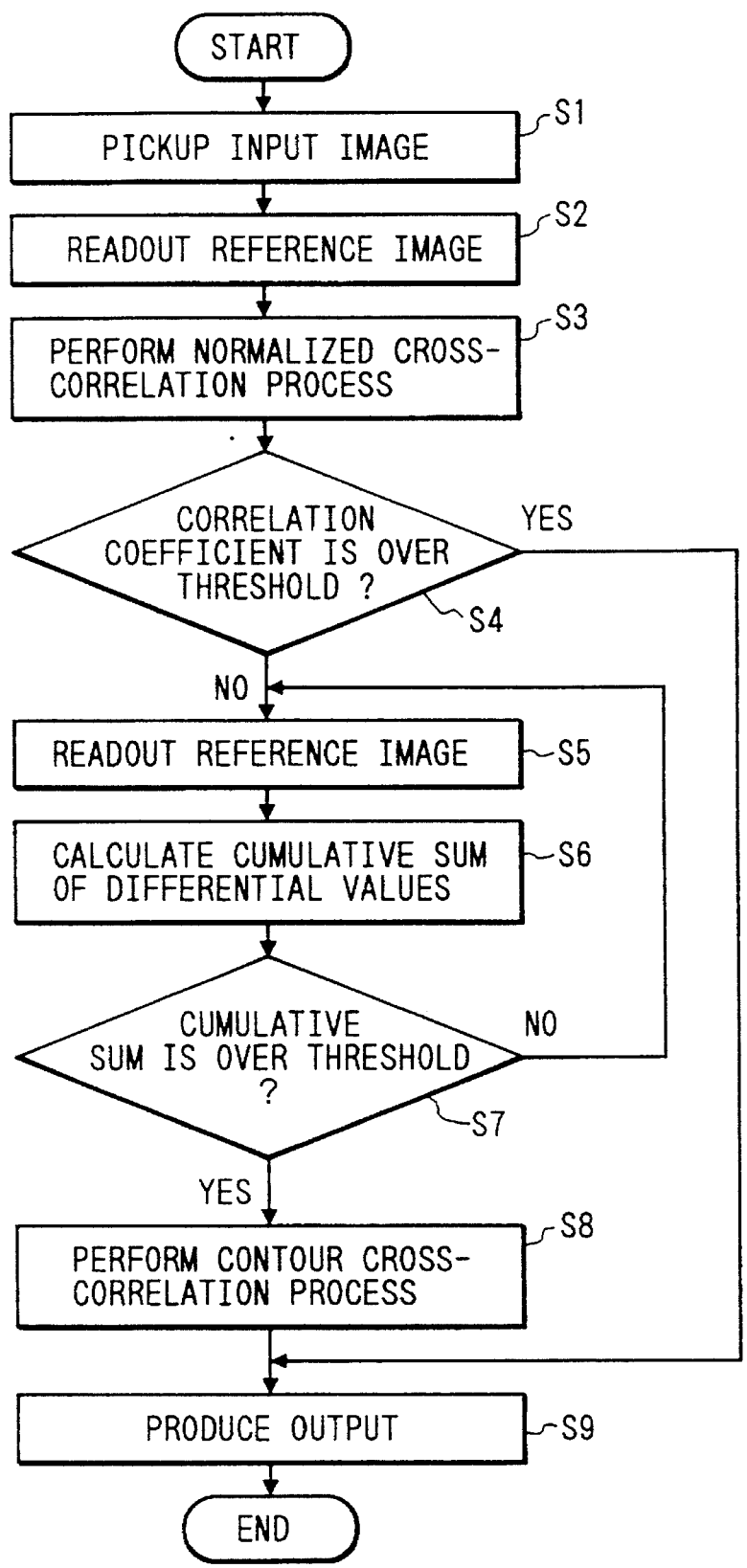
FIG. 2 is a flow chart for illustrating the operation of the first embodiment.

FIG. 1 is a block diagram showing a first embodiment of an image processing apparatus according to the present invention. In this figure, an image processing apparatus 1 is provided with a CPU board (hereinafter referred to as the host CPU board) 2 comprising a microcomputer, a memory, etc. and effecting the control of the image input and output operation, the correlation calculation process operation, etc., an image memory 3 and a fast processor 4. The host CPU board 2, the image memory 3 and the fast processor 4 are connected together by a system bus 5 and a data bus 6. A plurality of reference image data are input to and stored in advance in the memory of the host CPU board 2.

An image picked up by an image pickup element 7 such as a TV camera is stored as digital input image data into the image memory 3 through an A/D converter 8. The image data in the image memory 3 is output to an indicator 9 such as a TV monitor through a D/A converter 10. The result of the processing is output to an outside application unit 12 through an interface unit 11.

The operation of the present embodiment will now be described with reference to the flow chart of FIG. 2 and FIGS. 3 to 10.

When the program starts, at a step S1, an image to be pattern-matched is picked up by the image pickup element 7 and input image data is stored into the image memory 3 through the A/D converter 8. At a step S2, one of reference image data is read out from the memory of the host CPU board 2. At a step S3, the normalized cross-correlation process of the reference image data read out at the step S2 and the input image data in the image memory 3 is performed.

Figure 3:
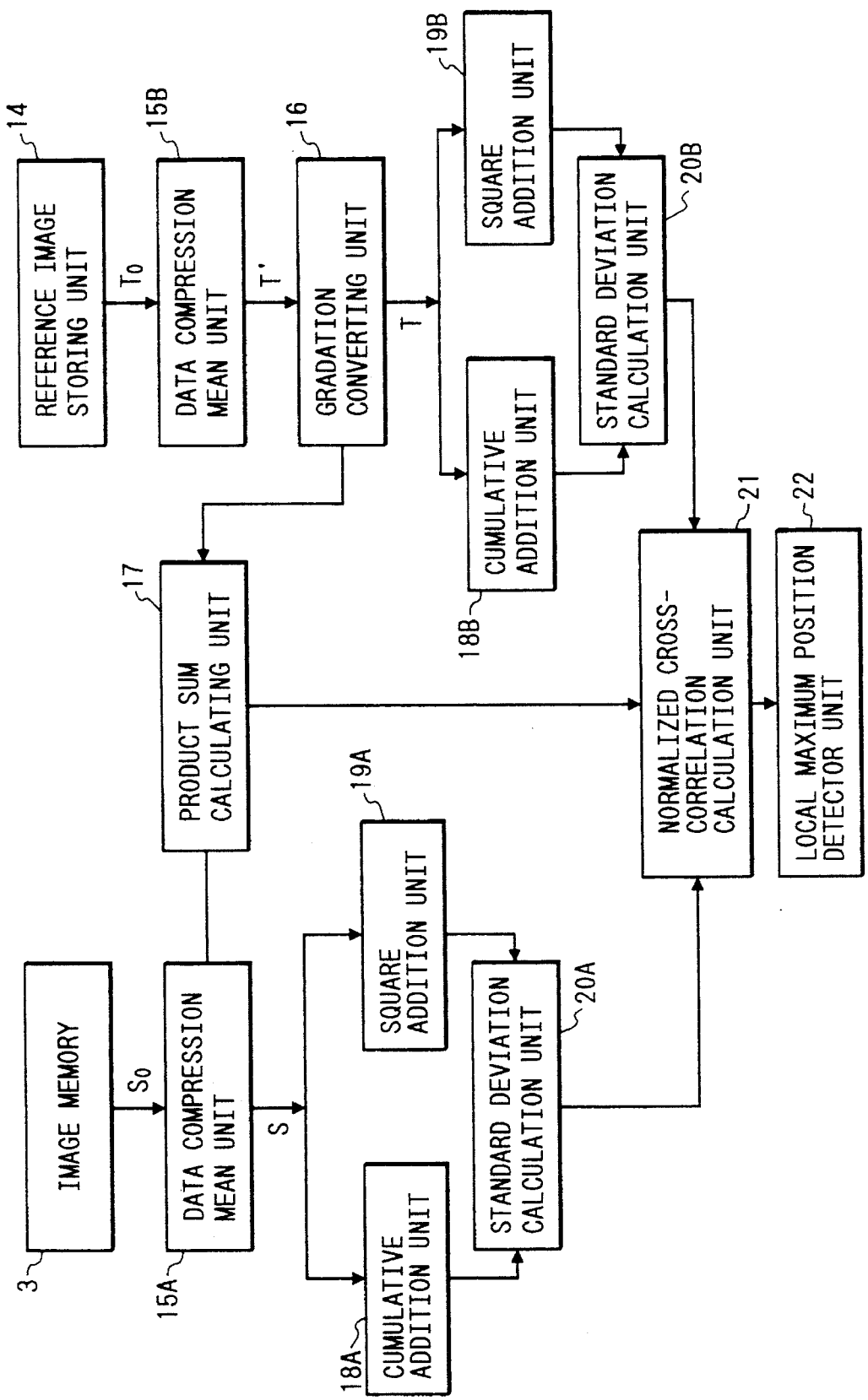
FIG. 3 is a block diagram showing the details of normalized cross-correlation processing.
Figure 10:
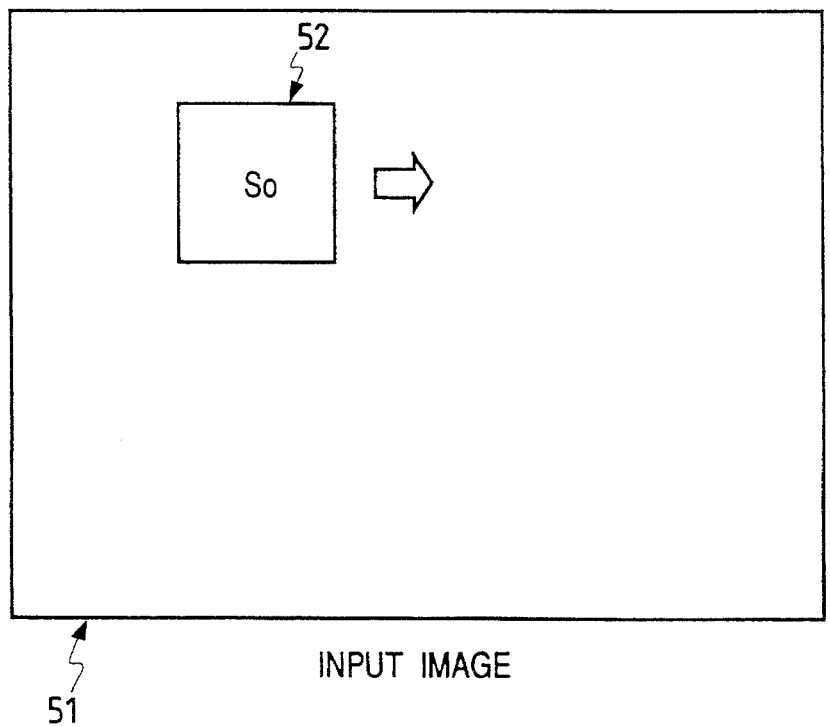
FIG. 10 shows the relation between an input image and an image to be compared cut out from the input image.

FIG. 3 shows the details of the normalized cross-correlation process in the present embodiment. Image data $S_0$ to be compared with the reference image data are successively read out from the image memory 3. The image data $S_0$ to be compared, correspond to images 52 successively cut out from the left upper portion to the right lower portion of the input image 51 as shown in FIG. 10 with the same size as the reference image while being deviated by a picture element each. In a data compression mean unit 15A, the image data $S_0$ to be compared is divided into (M×N) areas for the shortening of the calculation process time. Each of the divided areas consists of (p×q) picture elements, and the compression averaging of the image data $S_0$ to be compared is effected by a calculation process using the mean value of (p×q) data as representative of the data of each of the divided areas, whereby there are obtained (M×N) image data S to be compared. Likewise, in a data compression mean unit 15B, the compression averaging of the image data is effected on the reference image data $T_0$ read out from a reference image storing unit 14 in the host CPU board 2 at the step S2, whereby there are obtained (M×N) reference image data T'. In a gradation converting unit 16, the gradation conversion of the reference image data T' are effected so that the result of cross-correlation may be good, whereby there are obtained (M×N) reference image data T.

The product sum of the reference image data T and the image data S to be compared is calculated in a product sum calculating unit 17. This product sum is represented by ΣΣSij·Tij (where ΣΣ represents the sum total between 1≦i≦M and 1≦j≦N, and this also holds true hereinafter).

On the other hand, the cumulative sum ΣΣSij of the image data S to be compared is found in a cumulative addition unit 18A, and the square sum ΣΣSij² thereof is found in a square addition unit 19A. In a standard deviation calculation unit 20A, standard deviation $\sqrt{Ds}$ (see equation (2)) is found by the use of the cumulative sum ΣΣSij and the square sum ΣΣSij².

Likewise, the cumulative sum ΣΣTij of the reference image data T is found in a cumulative addition unit 18B, and the square sum ΣΣTij² thereof is found in a square addition unit 19B. In a standard deviation calculation unit 20B, standard deviation $\sqrt{Dt}$ (see equation (1)) is found by the use of the cumulative sum ΣΣTij and the square sum ΣΣTij².

In a normalized cross-correlation calculation unit 21, co-dispersion Dst (see equation (3)) is found by the use of the product sum ΣΣSijTij found by the product sum calculating unit 7 and also, a correlation coefficient $C_{ST}$ (see equation (4)) is found by the use of the standard deviations $\sqrt{Ds}$ and $\sqrt{Dt}$ found by the standard deviation calculation units 20A and 20B, respectively, and the co-dispersion Dst.

The above-described normalized cross-correlation calculation is repetitively performed with respect to the image data $S_0$ to be compared successively read out from the image memory 3. In a local maximum position detector unit 22, the following operation is performed as the step S4 of FIG. 2. The local maximum values of the above-mentioned correlation coefficient $C_{ST}$ are found, and the positions of the images to be compared which provide these local maximum values are found. These local maximum values and positions are temporarily memorized in the memory of the host CPU board 2. Further, whether these local maximum values are over a predetermined threshold value is judged. If there is a local maximum value judged to be over the threshold value, the position of the image data $S_0$ to be compared for which that local maximum value has been obtained is output to the application unit 12 through the interface unit 11. If there is no local maximum value which exceeds the threshold value, the program shifts to a step S5.

At the step S5, the same reference image data as those read out from the memory of the host CPU board 2 at the step S2 are read out. These read-out reference image data are used for the contour cross-correlation process which will be described later. At a step S6, the reference image data read out at the step S5 are passed through differential filters 41, 42 and 43, 44 having the directionalities of FIGS. 6 and 7, respectively, and the cumulative sums of the differential values when passed through the respective differential filters are found. The differential filters 41, 42 shown in FIG. 6 are Sobel differential filters having directionality in X-direction and Y-direction, and emphasize contour lines along Y-direction and X-direction. The differential filters 43, 44 shown in FIG. 7 are differential filters having directionality in XY direction (a direction represented by a linear function Y=X or Y=−X), and emphasize contour lines along XY direction. Accordingly, when contour lines along X-direction and Y-direction or XY-direction are included in the reference image data read out at the step S5, the cumulative sum of the differential values obtained when passed through the differential filters having directionality along those directions is indicative of a significant value.

At a step S7, whether the values of four cumulative sums are over a predetermined threshold value is judged, and if three or more of the four cumulative sums are judged to be below the threshold value, this reference image is regarded as having no contour of pattern or having a contour of pattern only in a certain direction, and the program returns to the step S5. Design may be made such that the program returns not to the step S5, but to the step S1. If it is judged that there are not three or more of the four cumulative sums which are below the threshold value, that is, there are two or more cumulative sums which exceed the threshold value, the reference image data is regarded as being appropriate, and the program shifts to the step S8. At the step S7, the contour cross-correlation process which will be described later is performed by the use of this reference image data.

Figure 4:
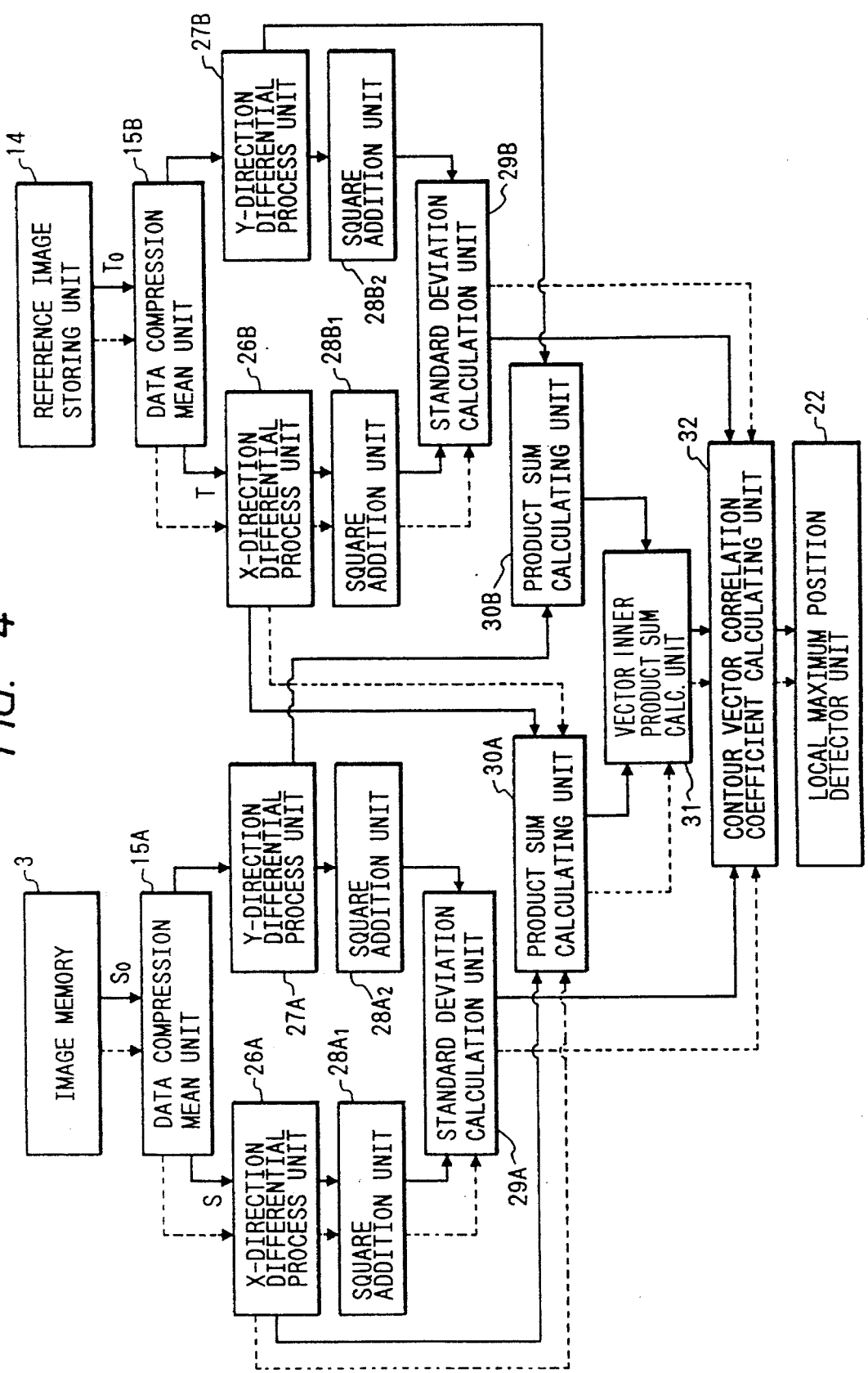
FIG. 4 is a block diagram showing the details of contour cross-correlation processing.

FIG. 4 shows the details of the contour cross-correlation process in the present embodiment. The operations of the image memory 3, the reference image storing unit 14, the data compression mean units 15A, 15B and the local maximum position detector unit 22 are similar to the case of the normalized cross-correlation process described previously and therefore need not be described. However, image data output from the data compression mean unit 15B are used as reference image data T.

Figure 14:
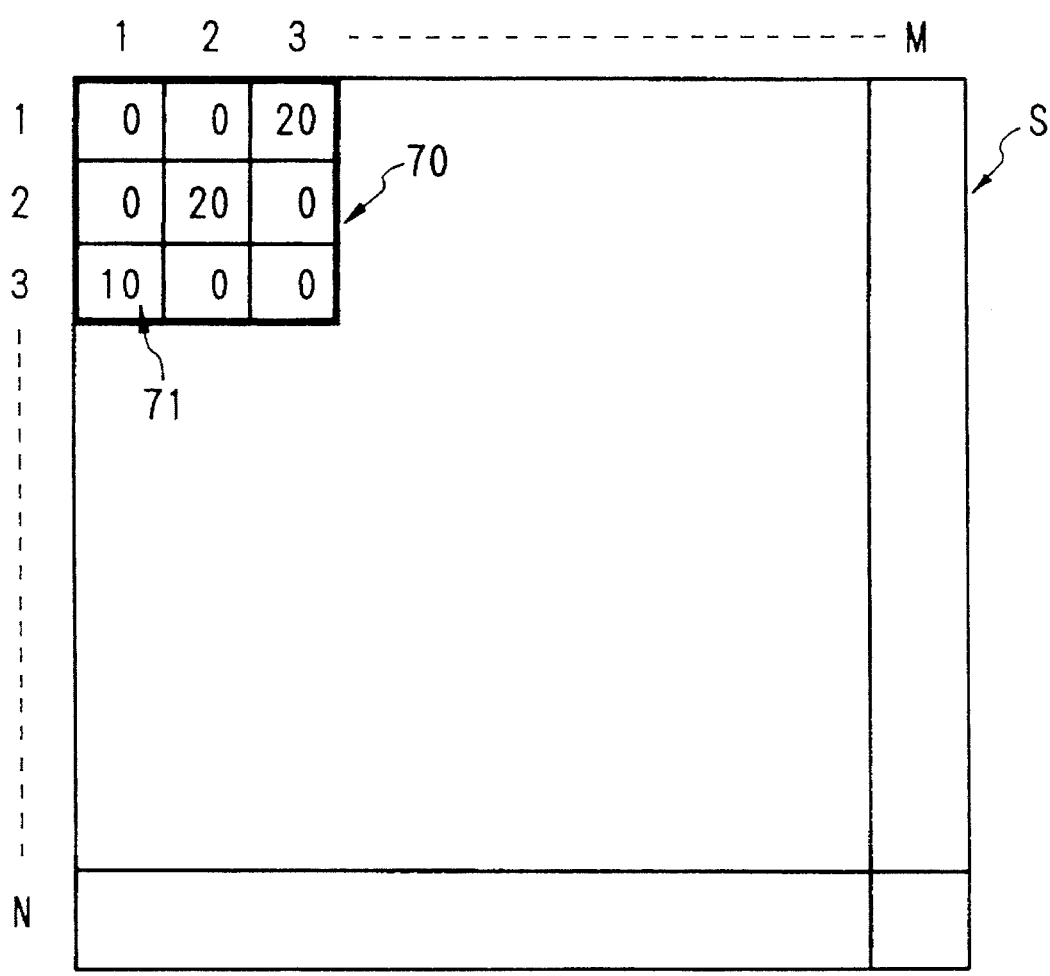
FIG. 14 shows the positional relation between the image S to be compared and the image of (3×3) matrix.

In X-direction differential process units 26A and 26B, (M×N) image data S to be compared and (M×N) reference image data T are passed through the X-direction Sobel differential filter 41 of Figure 6, whereby there are found X-direction differential values $Sy_{ij}$ and $Ty_{ij}$ (1≦i≦M, 1≦j≦N) in which Y-direction contour components are emphasized. Likewise, in Y-direction differential process units 27A and 27B, the image data S to be compared and the reference image data T are passed through the Y-direction Sobel differential filter 42 of FIG. 6, whereby there are found Y-direction differential values $Sx_{ij}$ and $Tx_{ij}$ (1≦i≦M, 1≦j≦N) in which X-direction contour components are emphasized. Consider vectors $\vec{S}$ and $\vec{T}$ (hereinafter referred to as the contour vectors) having $(Sx_{ij}, Sy_{ij})$ and $(Tx_{ij}, Ty_{ij})$ as shown in FIG. 9 as components. These contour vectors $\vec{S}$ and $\vec{T}$ each have as their origin the area G of an image 40 of (3×3) matrix generally indicated in FIG. 5, and are indicative of the intensity and directionality of the contour of the image 40 of (3×3) matrix. When for example, an image 70 of (3×3) matrix in the image S to be compared as shown in FIG. 14 is passed through the differential filters 41 and 42, there are obtained an X-direction differential value $Sy_{1,3}=10$ and a Y-direction differential value $Sx_{1,3}=10$. At this time, a vector having $(Sx_{1,3}, Sy_{1,3})=(10, 10)$ as its components has an area 71 as its origin, and is indicative of the intensity and directionality of the contour of the image 70 of (3×3) matrix. Here, the intensity of the contour represents the density difference between adjacent areas forming a boundary.

In square addition units $28A_1$, $28A_2$, $28B_1$ and $28B_2$, there are found the square sums $\Sigma\Sigma Sx_{ij}^2$, $\Sigma\Sigma Sy_{ij}^2$ and $\Sigma\Sigma Tx_{ij}^2$, $\Sigma\Sigma Ty_{ij}^2$ of the above-mentioned X-direction differential value and Y-direction differential value.

As shown in equation (3), in the normalized cross-correlation process, the normalization of density is effected by subtracting the mean density value from the density value of each divided area of the image. However, in the contour cross-correlation process of the result of the present embodiment, each image data is passed through the differential filter and therefore, in an area wherein the density value is constant, the differential value becomes 0. Accordingly, the sizes of the contour vectors $\vec{S}$ and $\vec{T}$ are not affected by a uniform variation in the density gradation of the entire image. This means that it becomes unnecessary to subtract the mean value of the contour vectors from the contour vectors to thereby normalize the density.

Consequently, in a standard deviation calculation unit 29A, the following equation (5) is found as the standard deviation of the contour vectors in the images to be compared from the square sums $\Sigma\Sigma Sx_{ij}^2$ and $\Sigma\Sigma Sy_{ij}^2$ of the images to be compared, and in a standard deviation calculation unit 29B, the result of the following equation (6) is found as the standard deviation of the contour vectors in the reference images from the square sums $\Sigma\Sigma Tx_{ij}^2$ and $\Sigma\Sigma Ty_{ij}^2$ of the reference images.

$$\sigma_{S_o} = \sqrt{\left\{ \left(\frac{1}{MN}\right) \sum_{i=1}^{M} \sum_{j=1}^{N} (\underline{S}_{ij})^2 \right\}} \tag{5}$$

$$= \sqrt{\left\{ \left(\frac{1}{MN}\right) \sum_{i=1}^{M} \sum_{j=1}^{N} (Sx_{ij}^2 + Sy_{ij}^2) \right\}}$$

$$\sigma_{T_o} = \sqrt{\left\{ \left(\frac{1}{MN}\right) \sum_{i=1}^{M} \sum_{j=1}^{N} (\underline{T}_{ij})^2 \right\}} \tag{6}$$

$$= \sqrt{\left\{ \left(\frac{1}{MN}\right) \sum_{i=1}^{M} \sum_{j=1}^{N} (Tx_{ij}^2 + Ty_{ij}^2) \right\}}$$

When these standard deviations are 0, normalizing calculation which will be described later is impossible and therefore, the subsequent calculation process is discontinued and the image to be compared at the next position can be read out to achieve a reduction in the memories used and the shortening of the process time.

In a product sum calculating unit 30A, there is found the product sum $\Sigma\Sigma Sy_{ij} \cdot Ty_{ij}$ of the X-direction differential value $Ty_{ij}$ of the reference image data and the X-direction differential value $Sy_{ij}$ of the image data to be compared obtained from the X-direction differential process units 26A and 26B, respectively. Likewise, in a product sum calculating unit 30B, there is found the product sum $\Sigma\Sigma Sx_{ij} \cdot Tx_{ij}$ of the Y-direction differential value $Tx_{ij}$ of the reference image data and the Y-direction differential value $Sx_{ij}$ of the image data to be compared obtained from the Y-direction differential process units 27A and 27B, respectively.

In a vector inner product sum calculating unit 31, as shown in the following equation (7), there is calculated the sum (inner product sum) of the product sum $\Sigma\Sigma Sy_{ij} \cdot Ty_{ij}$ of the X-direction differential values and the product sum $\Sigma\Sigma Sx_{ij} \cdot Tx_{ij}$ of the Y-direction differential values found in the product sum calculating units 30A and 30B, respectively, that is, the inner product sum of the contour vectors $\vec{S}$ and $\vec{T}$ is calculated, and this is divided by (M×N), whereby there is found the mean value of the inner product of the contour vectors $\vec{S}$ and $\vec{T}$.

$$\rho v_o = \left(\frac{1}{MN}\right) \sum_{i=1}^{M} \sum_{j=1}^{N} (\underline{T}_{ij} \times \underline{S}_{ij}) \tag{7}$$

$$= \left(\frac{1}{MN}\right) \sum_{i=1}^{M} \sum_{j=1}^{N} (|\underline{T}_{ij}||\underline{S}_{ij}|\cos\theta_{ij})$$

$$= \left(\frac{1}{MN}\right) \sum_{i=1}^{M} \sum_{j=1}^{N} (Tx_{ij}Sx_{ij} + Ty_{ij}Sy_{ij})$$

Thus, there is obtained a correlation value to which both of the directions and intensity of the contours of the reference image T and the image S to be compared are added.

In a contour vector correlation coefficient calculating unit 32, the mean value of the inner product $(Tx_{ij}Sx_{ij}+Ty_{ij}Sy_{ij})$ of the vectors found in the vector inner product sum calculating unit 31 is divided by the standard deviation value $\sqrt{[1/(M \cdot N) \cdot \Sigma\Sigma(Tx_{ij}^2+Ty_{ij}^2)]}$ of the contour vector of the reference image and the standard deviation value $\sqrt{[1/(M \cdot N) \cdot \Sigma\Sigma(Sx_{ij}^2+Sy_{ij}^2)]}$ of the contour vector of the image to be compared found in the standard deviation calculation units 29A and 29B, respectively, to normalize it, whereby a contour vector correlation coefficient Cv is calculated. This contour vector correlation coefficient Cv is represented by $$C_V = \frac{\rho v_o}{(\sigma_{T_o})(\sigma_{S_o})} \tag{8}$$

When a contour pattern exists on an image having a predetermined density gradient in a predetermined direction, as shown in $$\sigma_{S_1} = \sqrt{\left[ \left(\frac{1}{MN}\right) \sum_{i=1}^{M} \sum_{j=1}^{N} \left\{ \underline{S}_{ij} - \left(\frac{1}{MN}\right) \sum_{i=1}^{M} \sum_{j=1}^{N} \underline{S}_{ij} \right\}^2 \right]} \tag{9}$$

$$= \sqrt{\left[ \left(\frac{1}{MN}\right) \sum_{i=1}^{M} \sum_{j=1}^{N} (\underline{S}_{ij})^2 - \left(\frac{1}{MN}\right)^2 \left( \sum_{i=1}^{M} \sum_{j=1}^{N} \underline{S}_{ij} \right)^2 \right]}$$

$$= \sqrt{\left[ \left(\frac{1}{MN}\right) \sum_{i=1}^{M} \sum_{j=1}^{N} (Sx_{ij}^2 + Sy_{ij}^2) - \left(\frac{1}{MN}\right)^2 \left\{ \left(\sum_{i=1}^{M} \sum_{j=1}^{N} Sx_{ij}\right)^2 + \left(\sum_{i=1}^{M} \sum_{j=1}^{N} Sy_{ij}\right)^2 \right\} \right]}$$

$$\sigma_{T_1} = \sqrt{\left[ \left(\frac{1}{MN}\right) \sum_{i=1}^{M} \sum_{j=1}^{N} \left\{ T_{ij} - \left(\frac{1}{MN}\right) \sum_{i=1}^{M} \sum_{j=1}^{N} T_{ij} \right\}^2 \right]} \tag{10}$$

-continued $$= \sqrt{\left[\left(\frac{1}{MN}\right)\sum_{i=1}^{M}\sum_{j=1}^{N}(T_{ij})^2 - \left(\frac{1}{MN}\right)^2\left(\sum_{i=1}^{M}\sum_{j=1}^{N}T_{ij}\right)^2\right]}$$

$$= \sqrt{\left[\left(\frac{1}{MN}\right)\sum_{i=1}^{M}\sum_{j=1}^{N}(Tx_{ij}^2+Ty_{ij}^2) - \left(\frac{1}{MN}\right)^2\left\{\left(\sum_{i=1}^{M}\sum_{j=1}^{N}Tx_{ij}\right)^2 + \left(\sum_{i=1}^{M}\sum_{j=1}^{N}Ty_{ij}\right)^2\right\}\right]}$$

$$\rho_{V_1} = \left(\frac{1}{MN}\right)\sum_{i=1}^{M}\sum_{j=1}^{N}\left[\left\{\vec{T}_{ij} - \left(\frac{1}{MN}\right)\sum_{i=1}^{M}\sum_{j=1}^{N}\vec{T}_{ij}\right\} \times \left\{\vec{S}_{ij} - \left(\frac{1}{MN}\right)\sum_{i=1}^{M}\sum_{j=1}^{N}\vec{S}_{ij}\right\}\right] \quad (11)$$

$$= \left(\frac{1}{MN}\right)\left\{\sum_{i=1}^{M}\sum_{j=1}^{N}(\vec{T}_{ij}\times\vec{S}_{ij}) - \left(\frac{1}{MN}\right)\left(\sum_{i=1}^{M}\sum_{j=1}^{N}\vec{S}_{ij}\right)\times\left(\sum_{i=1}^{M}\sum_{j=1}^{N}\vec{T}_{ij}\right)\right\}$$

$$= \left(\frac{1}{MN}\right)\left\{\sum_{i=1}^{M}\sum_{j=1}^{N}(|T_{ij}||S_{ij}|\cos\theta_{ij}) - \left(\frac{1}{MN}\right)\left(\left|\sum_{i=1}^{M}\sum_{j=1}^{N}\vec{S}_{ij}\right|\left|\sum_{i=1}^{M}\sum_{j=1}^{N}\vec{T}_{ij}\right|\cos\Phi\right)\right\}$$

$$= \left(\frac{1}{MN}\right)\left[\sum_{i=1}^{M}\sum_{j=1}^{N}(Tx_{ij}Sx_{ij}+Ty_{ij}Sy_{ij}) - \left(\frac{1}{MN}\right)\left\{\left(\sum_{i=1}^{M}\sum_{j=1}^{N}Sx_{ij}\right)\left(\sum_{i=1}^{M}\sum_{j=1}^{N}Tx_{ij}\right) + \left(\sum_{i=1}^{M}\sum_{j=1}^{N}Sy_{ij}\right)\left(\sum_{i=1}^{M}\sum_{j=1}^{N}Ty_{ij}\right)\right\}\right]$$

the mean value of the contour vector is subtracted from each contour vector to normalize it, whereby the contour vector correlation coefficient Cv is represented by $$C_V = \frac{\rho_{V_1}}{(\sigma_{T_1})(\sigma_{S_1})} \quad (12)$$

By this normalization, the pattern matching with the reference image can be accomplished even when there is a predetermined density gradient in the input image.

Figure 12:
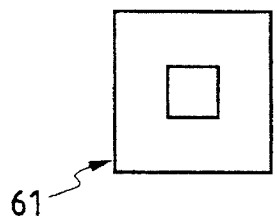
FIG. 12 shows a pattern comprising only contours by a line drawing.
Figure 13:
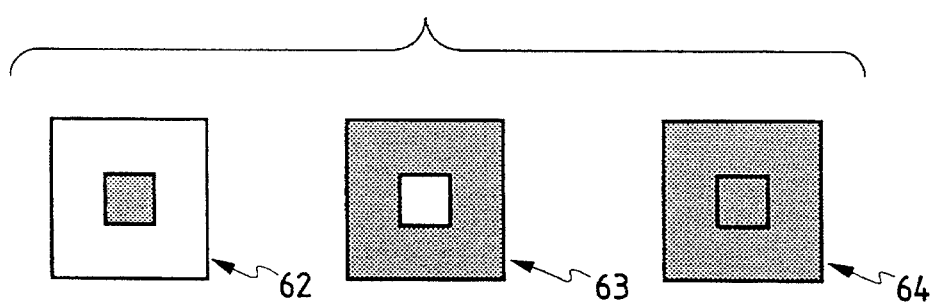
FIG. 13 shows the difference between the gradation distributions of patterns which are identical in the configurations of contour lines.

When a vertically and horizontally symmetrical contour pattern as shown in FIG. 12 or 13 exists on an image of constant density gradation, the mean value $1/(M\cdot N)\cdot\Sigma\Sigma\vec{T}_{ij}$ of the contour vector of the reference image is 0 and the mean value $1/(M\cdot N)\cdot\Sigma\Sigma\vec{S}_{ij}$ of the contour vector of the image to be compared is 0, and the standard deviation of the contour vector of the image to be compared of equation (9) coincides with equation (5), the standard deviation of the contour vector of the reference image of equation (10) coincides with equation (6), and the mean value of the inner product of the vectors of equation (11) coincides with equation (7), and thus, the contour vector correlation coefficient Cv of equation (12) coincides with equation (8).

The correlation coefficient Cv assumes a value within the range of $-1 \leq Cv \leq +1$, and when Cv=+1, it indicates that the directions and intensities of the contours of the image S to be compared and the reference image T are coincident with each other. When Cv=−1, it indicates that the intensities of the contours of the image S to be compared and the reference image T are coincident with each other, but the directions of the contours of those images are opposite to each other by 180°, that is, the contrast of the gradations of the reference image and the image to be compared is inverted. When Cv=0, it indicates that there is no correlation between the directions of the contours of the image S to be compared and the reference image T. For example, when the pattern 61 of FIG. 12 is the reference image and when the pattern 61 of FIG. 12 is the image to be compared, the directions and intensities of the contours of the images are coincident with each other and therefore, the value of the correlation coefficient Cv is +1. Also, when the pattern 62 of FIG. 13 is the reference image and the pattern 63 of FIG. 13 is the image to be compared, the contrast of the gradations of the patterns is inverted and therefore, the correlation coefficient Cv is −1.

Accordingly, when it is desired to find the position of the image to be compared which is inverted in the contrast of gradation with respect to the reference image, the minimum value of the correlation coefficient Cv can be calculated to thereby find the position of the image to be compared which gives a maximum value approximate to Cv=−1.

Also, when it is desired to find the position of the image to be compared which is coincident in the shape of the contour line with the reference image independently of the contrast of gradation, the maximum value of the absolute value |Cv| of the correlation coefficient can be calculated to thereby find the position of the image to be compared which gives a maximum value exceeding a predetermined threshold value. For example, when the pattern 61 of FIG. 12 is the reference image and the patterns 62, 63 and 64 of FIG. 13 are the images to be compared, the reference image and each of the images to be compared are coincident in the shape of the contour line with each other and therefore, the absolute value |Cv| is a maximum value exceeding a predetermined threshold value.

Where an image to be compared which is coincident in the shape of the contour line with the reference image but is inverted in the contrast of gradation with respect to the reference image is judged to be an image differing from the reference image, when the inner product sum calculated in the vector inner product sum calculating unit 31 of FIG. 4 becomes 0 or less, the subsequent calculation process can be discontinued and the image to be compared at the next position can be read out to thereby achieve a reduction in the memories used and the shortening of the process time.

The above-described contour cross-correlation process is repetitively performed with respect to respective images $S_0$ to be compared which are successively read out from the image memory 3, and the position of the image data to be compared for which the maximum value of the correlation coefficient Cv exceeding a predetermined threshold value has been obtained is output to the outside application unit 12 through the interface unit 11.

The pattern matching of the input image and the reference image can be accomplished by the procedure shown above. In the present embodiment, the image S to be compared cut out from the input image and the reference image T are passed through the X-direction and Y-direction Sobel differential filters, and vectors having the intensity and directionality of the contour of each image are found from the differential values thereof, and the correlativity of the images is found by the use of the inner product of these vectors. Accordingly, even if the pattern 61 as shown in FIG. 12 which comprises only contours by a line drawing is used as the reference image, there is little possibility of wrong recognition as in normalized cross-correlation calculation, and reliable pattern recognition can be accomplished. Also, even if there is a partial variation in the contrast of gradation between the image to be compared and the reference image, the contour image itself does not affect the variation in the contrast of gradation and therefore, more reliable pattern recognition than the normalized cross-correlation calculation can be accomplished.

Moreover, the pattern recognition by the normalized cross-correlation calculation is effected at first, and when the result of this is not good, contour cross-correlation calculation is effected and therefore, there is also the advantage that by these two kinds of calculations, reliable and accurate pattern recognition can be accomplished for a wide variety of images.

In the above-described first embodiment, the image to be compared cut out from the input image and the reference image are passed through differential filters having directionality, i.e., partial differential filters, to thereby obtain differential values, but for an image having relatively little noise and having a clear-cut contour, differential values may be obtained by the use of a directionality-free (i.e., total differential) Laplacean filters 45 and 46 as shown in FIG. 8. In such case, the differential values become scalar values which do not have peculiar directionality but have intensity alone. A contour scalar correlation coefficient Cs indicative of the correlation of only the intensity of contour between the reference image T and the image S to be compared is represented, from $$\sigma_{S_2} = \sqrt{\left\{ \left( \frac{1}{MN} \right) \sum_{i=1}^{M} \sum_{j=1}^{N} S_{ij}^2 \right\}} \quad (13)$$

$$\sigma_{T_2} = \sqrt{\left\{ \left( \frac{1}{MN} \right) \sum_{i=1}^{M} \sum_{j=1}^{N} T_{ij}^2 \right\}} \quad (14)$$

$$\rho_{S_0} = \left( \frac{1}{MN} \right) \sum_{i=1}^{M} \sum_{j=1}^{N} (T_{ij} S_{ij}) \quad (15)$$

by $$C_S = \frac{\rho_{S_0}}{(\sigma_{T_2})(\sigma_{S_2})} \quad (16)$$

Also, in contour scalar correlation, even when a predetermined variation in density gradient exists in the image to be compared, a secondary differential value using Laplacean filters always becomes 0 and therefore, it is not necessary to subtract the mean value of each contour scalar from each contour scalar value. The value of the correlation coefficient Cs assumes the range of $-1 \leq C_S \leq +1$.

Accordingly, again by the present embodiment, an operational effect similar to that of the above-described first embodiment can be obtained. Particularly, in the present embodiment, the calculation filters having directionality like the Sobel filters need not be passed twice in X-direction and Y-direction and thus, the calculation process time can be further shortened. In FIG. 4, dotted-line arrows indicate the flow of the contour scalar correlation coefficient calculation process.

FIG. 11 is a flow chart showing the operation of a second embodiment of the image processing method and apparatus according to the present invention. In this embodiment, which of the normalized cross-correlation process (step S23) and the contour cross-correlation process (step S28) should be used to effect pattern recognition is predetermined. At a step S21, the input image is read, whereafter at a step S20, which of the two processes should be carried out is judged, and in accordance with the result of this (judgment) one of the two processes is carried out. In the other points, the operation of this embodiment is similar to that of the first embodiment. Consequently, again by this embodiment, an operational effect similar to that of the above-described first embodiment can be obtained.

In the correspondence between the embodiments and the appended claims, the image memory 3 includes memory means, the image pickup element 7 and A/D converter 8 include input means, and the host CPU board 2 includes differentiation means, differential correlation calculation means, inner product sum calculation means, normalizing means, correlation value calculation means, selecting means, discriminating means and image recognizing means.

The image processing method and apparatus of the present invention do not have their details restricted to the above-described embodiments, but permit various modifications. As an example, at the step S20 of FIG. 11, the normalized cross-correlation process and the contour cross-correlation process may be automatically changed over depending on the property of the reference image.

What is claimed is:

1. An image processing method of effecting the pattern matching of an input image and a reference image including a reference pattern, said reference image being memorized in advance in a first image memory and said input image being picked-up by a pick-up device and memorized in a second image memory, said method comprising the steps of:

(a) reading out said reference image from said first image memory, (b) reading out image portions to be compared equal in size to said reference image successively from said second image memory, (c) passing said reference image through a first differential filter having directionality in a first direction to obtain a first differential reference image in which contours of the reference pattern along said first direction are emphasized, (d) passing said reference image through a second differential filter having directionality in a second direction perpendicular to said first direction to obtain a second differential reference image in which contours of the reference pattern along said second direction are emphasized, (e) passing said image portions to be compared through said first differential filter to obtain first differential images to be compared in which contours along said first direction are emphasized, (f) passing said image portions to be compared through said second differential filter to obtain second differential images to be compared in which contours along said second direction are emphasized, (g) calculating differential cross-correlation values of said reference image and said image portions to be compared based on contour directionality and intensity by comparing said first differential images to be compared with said first differential reference image and by comparing said second differential images to be compared with said second differential reference image, and (h) detecting a position in said input image of a pattern identical or similar to said reference pattern based on said differential cross-correlation values.

2. An image processing method according to claim 1, wherein said first and second differential filters include Sobel filters.

3. An image processing method according to claim 1, further including the step of normalizing said differential cross-correlation values.

4. An image processing method according to claim 1, further including the step of calculating initial cross-correlation values of said reference image and said image portions to be compared by comparing said image portions to be compared with said reference image, and wherein said reference image and said image portions to be compared are passed through said first and second differential filters to calculate said differential cross-correlation values when said initial cross-correlation values are smaller than a predetermined threshold value.

5. An image processing method according to claim 1, further including the step of discriminating whether said reference image is an image appropriate to calculate said differential cross-correlation values.

6. An image processing apparatus for effecting pattern matching of an input image and a reference image including a reference pattern, comprising:

a first image memory for memorizing said reference image, a pick-up device for picking-up said input image, a second image memory for memorizing said input image picked-up by said pick-up device, and an image processing system including means for reading out said reference image from said first image memory and reading out image portions to be compared equal in size to said reference image successively from said second image memory, means for passing said reference image through a first differential filter having directionality in a first direction to obtain a first differential reference image in which contours of the reference pattern along said first direction are emphasized and passing said reference image through a second differential filter having directionality in a second direction perpendicular to said first direction to obtain a second differential reference image in which contours of the reference pattern along said second direction are emphasized, means for passing said image portions to be compared through said first differential filter to obtain first differential images to be compared in which contours along said first direction are emphasized and passing said image portions to be compared through said second differential filter to obtain second differential images to be compared in which contours along said second direction are emphasized, means for calculating differential cross-correlation values of said reference image and said image portions to be compared based on contour directionality and intensity by comparing said first differential images to be compared with said first differential reference image and by comparing said second differential images to be compared with said second differential reference image, and means for detecting a position in said input image of a pattern identical or similar to said reference pattern based on said differential cross-correlation values.

7. An image processing method of effecting the pattern matching of an input image and a reference image including a reference pattern, said reference image being memorized in advance in a first image memory, and said input image being picked up by a pick-up device and memorized in a second image memory, said method comprising the steps of:

(a) reading out said reference image from said first image memory, (b) reading out image portions to be compared equal in size to said reference image successively from said second image memory, (c) passing said reference image through a first differential filter having directionality in a first direction to obtain a first differential reference image in which contours of the reference pattern along said first direction are emphasized, (d) passing said reference image through a second differential filter having directionality in a second direction perpendicular to said first direction to obtain a second differential reference image in which contours of the reference pattern along said second direction are emphasized, (e) passing said image portions to be compared through said first differential filter to obtain first differential images to be compared in which contours along said first direction are emphasized, (f) passing said image portions to be compared through said second differential filter to obtain second differential images to be compared in which contours along said second direction are emphasized, (g) calculating differential cross-correlation values of said reference image and said image portions to be compared based on contour directionality and intensity by comparing said first differential images to be compared with said first differential reference image and by comparing said second differential images to be compared with said second differential reference image, and (h) discriminating a state of the pattern matching of said reference image and said image portions to be compared based on said differential cross-correlation values.

8. An image processing method according to claim 7, wherein said first and second differential filters include Sobel filters.

9. An image processing method according to claim 7, further including the step of normalizing said differential cross-correlation values.

10. An image processing method according to claim 7, further including the step of calculating initial cross-correlation values of said reference image and said image portions to be compared by comparing said image portions to be compared with said reference image, and wherein said reference image and said image portions to be compared are passed through said first and second differential filters to calculate said differential cross-correlation values when said initial cross-correlation values are smaller than a predetermined threshold value.

11. An image processing method according to claim 7, further including the step of discriminating whether said reference image is an image appropriate to calculate said differential cross-correlation values.

12. An image processing apparatus for effecting pattern matching of an input image and a reference image including a reference pattern, comprising:

a first image memory for memorizing said reference image, a pick-up device for picking-up said input image, a second image memory for memorizing said input image picked-up by said pick-up device, and an image processing system including means for reading out said reference image from said first image memory and reading out image portions to be compared equal in size to said reference image successively from said second image memory, means for passing said reference image through a first differential filter having directionality in a first direction to obtain a first differential reference image in which contours of the reference pattern along said first direction are emphasized and passing said reference image through a second differential filter having directionality in a second direction perpendicular to said first direction to obtain a second differential reference image in which contours of the reference pattern along said second direction are emphasized, means for passing said image portions to be compared through said first differential filter to obtain first differential images to be compared in which contours along said first direction are emphasized and passing said image portions to be compared through said second differential filter to obtain second differential images to be compared in which contours along said second direction are emphasized, means for calculating differential cross-correlation values of said reference image and said image portions to be compared based on contour directionality and intensity by comparing said first differential images to be compared with said first differential reference image and by comparing said second differential images to be compared with said second differential reference image, and means for discriminating a state of the pattern matching of said reference image and said image portions to be compared based on said differential cross-correlation values.

13. An image processing method of effecting the pattern matching of an input image and a reference image including a reference pattern, said reference image being memorized in advance in a first image memory, and said input image being picked up by a pick-up device and memorized in a second image memory, said method comprising the steps of:

(a) reading out said reference image from said first image memory, (b) reading out an image portion to be compared equal in size to said reference image from said second image memory, (c) passing said reference image through a first differential filter having directionality in a first direction to obtain a first differential reference image in which contours of the reference pattern along said first direction are emphasized, (d) passing said reference image through a second differential filter having directionality in a second direction perpendicular to said first direction to obtain a second differential reference image in which contours of the reference pattern along said second direction are emphasized, (e) passing said image portion to be compared through said first differential filter to obtain a first differential image to be compared in which contours along said first direction are emphasized, (f) passing said image portion to be compared through said second differential filter to obtain a second differential image to be compared in which contours along said second direction are emphasized, (g) calculating a differential cross-correlation value of said reference image and said image portion to be compared based on contour directionality and intensity by comparing said first differential image to be compared with said first differential reference image and by comparing said second differential image to be compared with said second differential reference image, and (h) discriminating a state of the pattern matching of said reference image and said image portion to be compared based on said differential cross-correlation value.

14. An image processing method according to claim 13, wherein said first and second differential filters include Sobel filters.

15. An image processing method according to claim 13, further including the step of normalizing said differential cross-correlation value.

16. An image processing method according to claim 13, further including the step of calculating an initial cross-correlation value of said reference image and said image portion to be compared by comparing said image portion to be compared with said reference image, and wherein said reference image and said image portion to be compared are passed through said first and second differential filters to calculate said differential cross-correlation value when said initial cross-correlation value is smaller than a predetermined threshold value.

17. An image processing method according to claim 13, further including the step of discriminating whether said reference image is an image appropriate to calculate said differential cross-correlation value.

18. An image processing apparatus for effecting pattern matching of an input image and a reference image including a reference pattern, comprising:

a first image memory for memorizing said reference image, a pick-up device for picking-up said input image, a second image memory for memorizing said input image picked-up by said pick-up device, and an image processing system including means for reading out said reference image from said first image memory and reading out an image portion to be compared equal in size to said reference image from said second image memory, means for passing said reference image through a first differential filter having directionality in a first direction to obtain a first differential reference image in which contours of the reference pattern along said first direction are emphasized and passing said reference image through a second differential filter having directionality in a second direction perpendicular to said first direction to obtain a second differential reference image in which contours of the reference pattern along said second direction are emphasized, means for passing said image portion to be compared through said first differential filter to obtain a first differential image to be compared in which contours along said first direction are emphasized and passing said image portion to be compared through said second differential filter to obtain a second differential image to be compared in which contours along said second direction are emphasized, means for calculating a differential cross-correlation value of said reference image and said image portion to be compared based on contour directionality and intensity by comparing said first differential image to be compared with said first differential reference image and by comparing said second differential image to be compared with said second differential reference image, and means for discriminating a state of the pattern matching of said reference image and said image portion to be compared based on said differential cross-correlation value.

* * * * *